UNITED STATES PATENT OFFICE.

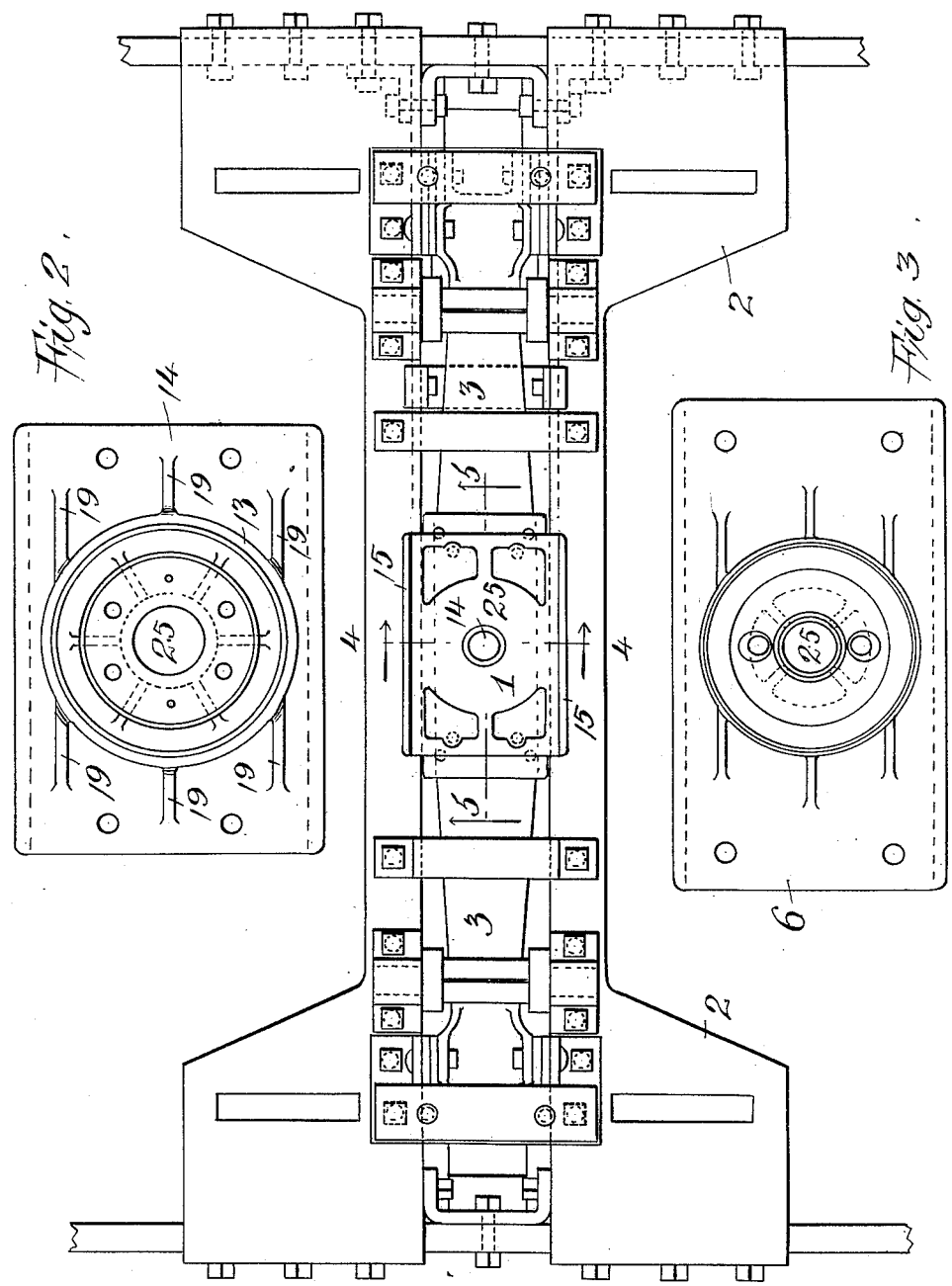

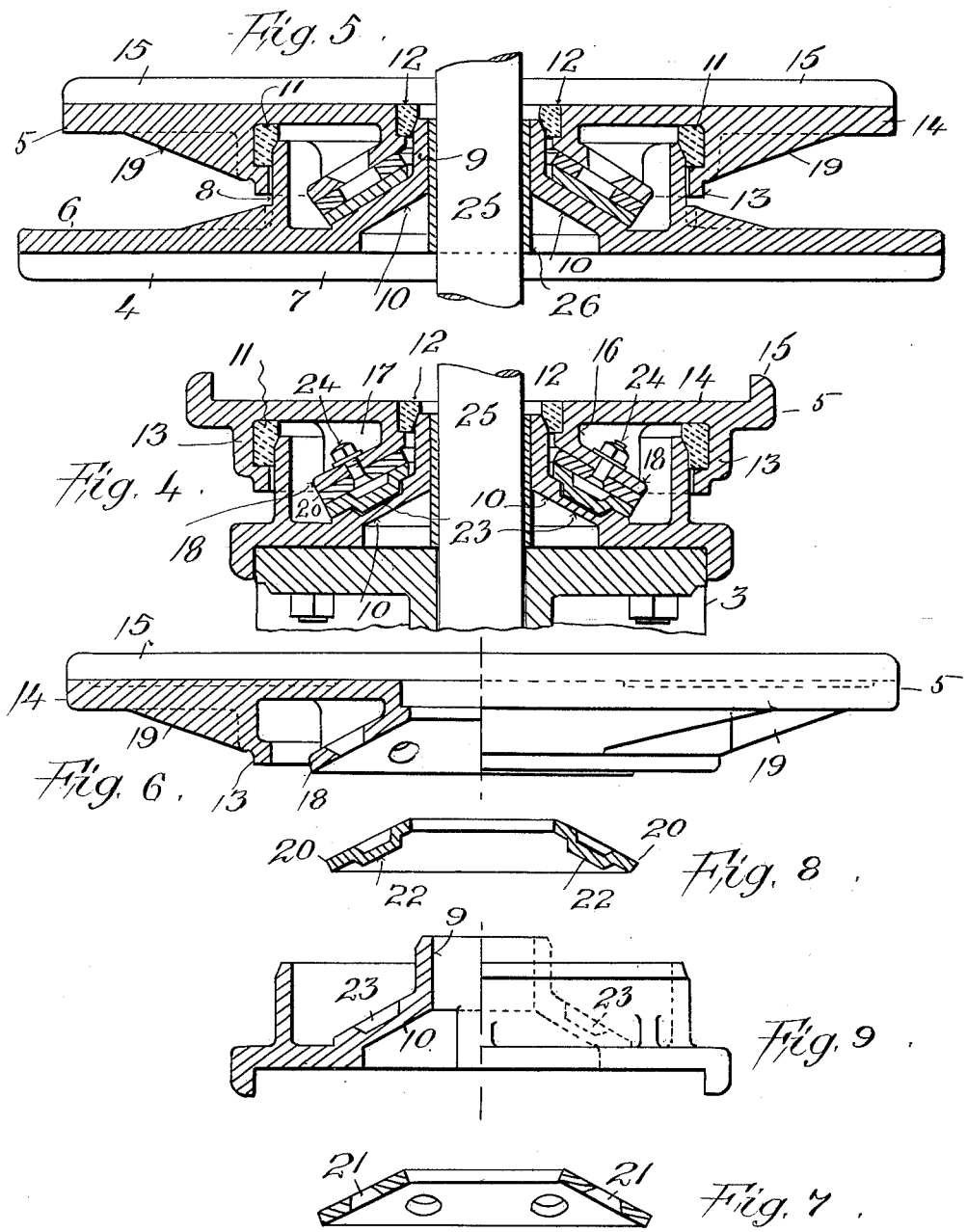

WALTER S. ADAMS, OF PHILADELPHIA, PENNSYLVANIA, ASSIGNOR TO THE J. G. BRILL CO., OF PHILADELPHIA, PENNSYLVANIA, A CORPORATION OF PENNSYLVANIA.

CENTER-BEARING FOR PIVOTAL TRUCKS.

1,094,185.   Specification of Letters Patent.   Patented Apr. 21, 1914.

Application filed June 24, 1913. Serial No. 775,463.

*To all whom it may concern:*

Be it known that I, WALTER S. ADAMS, a citizen of the United States, and a resident of the city and county of Philadelphia, State of Pennsylvania, have invented a new and useful Improvement in Center-Bearings for Pivotal Trucks, of which the following is a specification.

The object of my invention is to provide a device of this class which will always run true and remain true under all the conditions of service, and also to provide a bearing which will be readily lubricated and kept properly lubricated by the action of the device. These, and other objects, are accomplished by my invention, one embodiment of which is hereinafter set forth.

For a more particular description of my invention, reference is to be had to the accompanying drawings, forming a part hereof, in which—

Figure 1 is a plan view of a truck provided with my improvement; Fig. 2 is an inverted plan view of the portion of the bearing which is adapted to be fastened to a car body, or a car bolster; Fig. 3 is a plan view of the portion of the bearing which is adapted to be fastened to a truck bolster; Fig. 4 is a sectional view, taken on the line 4—4 of Fig. 1, looking in the direction of the arrows; Fig. 5 is a sectional view, taken on the line 5—5 of Fig. 1, looking in the direction of the arrows; Fig. 6 is a side elevation, partially in section, of the part of the bearing adapted to be fixed to a car body; Fig. 7 is a sectional view of a wear plate adapted to be fastened to the structure shown in Fig. 6; Fig. 8 is a sectional view of a second wear plate adapted to be secured to the truck member of the bearing; and Fig. 9 is a view, partially in section, showing the portion of the bearing adapted to be secured to a truck member.

Throughout the various views of the drawings, similar reference characters designate similar parts.

My improved bearing 1 may be applied to any pivoted truck, and is preferably applied to a truck 2 having a bolster 3. The bearing 1 has a lower member 4 which is adapted to be secured to a truck bolster, and an upper portion 5 which is adapted to be secured to a car bolster. The lower member 4 is provided with a bottom plate 6 having side flanges 7 which preferably rest on opposite sides of the bolster. An annular collar 8 is bent upwardly from this bottom plate 6 and concentric with this annular collar 8 is a second collar 9 which is adapted to surround the king bolt. The lower portion of this collar 9 is made conical in form as shown at 10, so as to provide a suitable seat for a wear plate which will be described below. The collars 8 and 9 extend well up into the upper member 5 so as to provide a large oil reservoir which will hold enough oil to keep the bearings thoroughly lubricated at all times. The upper and outer edges of these collars 8 and 9 are properly beveled so as to fit snug against washers 11 and 12 which are securely held in suitable recesses in the upper portion 5.

The upper portion 5 has a downwardly extending collar 13 which is secured to a horizontally disposed plate 14 with upwardly extending flanges 15 which are adapted to rest on the under side of the car bolster. The annular flange 13 extends well down on the collar 8 when the device is assembled and in condition for use. Concentric with the flange or collar 13 and also with the flanges 8 and 9, is a flange 16 which has an outwardly flared portion which runs substantially parallel with the part 10 of the collar 9. Suitable reinforcing webs 17 are employed so as to rigidly hold the inclined part 18 in place. Corresponding webs 19 reinforce the collar 13, as shown in Fig. 6.

Two wear plates 20 and 21 are employed, the former being provided with projections 22 which enter into corresponding recesses 23 on the upper face of the part 10 of the center flange 9 and the wear plate 21 is held in position in the part 18 of the collar 16 by means of suitable bolts 24, or any other suitable means. To reduce wear and friction it is preferable to make the two wear plates 20 and 21 out of different kinds of metal, the plate 20 being made out of bronze and the plate 21 of steel. This may be varied as desired. It is important that these wear plates should be so shaped as to fit together, also to fit the surfaces to which they are attached. They are preferably made in the manner shown.

All of the annular collars 9, 16, 8 and 13 are concentric with the axis of the king bolt 25, and if desired a sleeve 26 may be placed on the outside of this king bolt. After the parts are assembled as above set forth, and oil is supplied in the reservoir provided for the same, dust is excluded by the washers 11 and 12, and wear is provided for by the plates 20 and 21, so that at all times there is a sufficient and perfect lubrication. As all wear takes place on conical surfaces, it is obvious that the wear will maintain the upper and lower center plates concentric with the king bolt center.

While I have shown and described one embodiment of my invention, it is obvious that it is not restricted thereto, but is broad enough to cover all structures that come within the scope of the annexed claims.

It will be noted that the outside diameter of the conical surface is unconfined so that any grit or metal will naturally find its way out from between the surfaces of the two wearing plates.

What I claim is:

1. In a device of the class described, a lower part and an upper part having conical surfaces and wear plates mounted on said surfaces, the outside diameter of such conical surfaces being unconfined.

2. In a device of the class described, a lower part and an upper part having conical surfaces between them, wear plates on said surfaces and annular rings surrounding said wear surfaces whereby an oil reservoir is formed.

3. In a device of the class described, an upper part and a lower part with conical surfaces between them, wear plates on said conical surfaces, annular collars surrounding said wear plates and packing connecting said collars whereby dust is excluded from the bearings and an oil reservoir is provided.

4. In a device of the class described, an upper and a lower part having conical surfaces between them and wear plates secured to each of said surfaces, said wear plates adapted to run against each other.

5. In a device of the class described, upper and lower parts having conical seats between them, wear plates on said seats and fixed thereto, annular collars surrounding said seats and forming an oil reservoir, and means for preventing dust from entering said reservoir.

6. In a device of the class described, upper and lower parts having conical seats between them, wear plates on said seats, one of said wear plates having projections and said lower part having recesses on its upper face to receive said projections.

7. In a device of the class described, upper and lower parts having conical seats between them, wear plates on said seats, one of said wear plates having projections and said lower part having recesses on its upper face to receive said projections, said wear plates being of different kinds of metal.

8. In a device of the class described, an upper part and a lower part having conical surfaces between them with their outside diameters unconfined, and wear plates secured to each of said surfaces and adapted to run against each other, said wear plates being of different kinds of metal.

Signed at the city of Philadelphia, county of Philadelphia, and State of Pennsylvania, this 14th day of June, 1913.

WALTER S. ADAMS.

Witnesses:
HENRY C. ESLING,
H. F. McKILLIP.

Copies of this patent may be obtained for five cents each, by addressing the "Commissioner of Patents, Washington, D. C."